United States Patent
Scott et al.

(10) Patent No.: US 9,120,567 B2
(45) Date of Patent: Sep. 1, 2015

(54) HIGH SPEED COMPOUND ROTARY WING AIRCRAFT

(75) Inventors: Mark W. Scott, Bethany, CT (US); Stephen M. Gatto, Cheshire, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 39 days.

(21) Appl. No.: 13/493,559

(22) Filed: Jun. 11, 2012

(65) Prior Publication Data

US 2013/0327879 A1 Dec. 12, 2013

(51) Int. Cl.
*B64C 27/57* (2006.01)
*B64C 27/72* (2006.01)
*B64C 27/82* (2006.01)
*B64C 21/04* (2006.01)
*B64C 21/08* (2006.01)

(52) U.S. Cl.
CPC .............. *B64C 27/72* (2013.01); *B64C 21/04* (2013.01); *B64C 21/08* (2013.01); *B64C 27/82* (2013.01); *B64C 2027/725* (2013.01); *B64C 2027/7227* (2013.01); *B64C 2027/7266* (2013.01); *B64C 2027/8236* (2013.01); *B64C 2230/06* (2013.01); *B64C 2230/14* (2013.01); *B64C 2230/20* (2013.01); *B64C 2230/28* (2013.01); *Y02T 50/166* (2013.01); *Y02T 50/34* (2013.01)

(58) Field of Classification Search
USPC ................. 244/17.11, 17.13, 17.19, 204, 207
See application file for complete search history.

(56) References Cited

U.S. PATENT DOCUMENTS

| | | | | |
|---|---|---|---|---|
| 2,638,990 A | * | 5/1953 | Pitcairn | 416/90 R |
| 2,959,373 A | * | 11/1960 | Zuck | 244/7 C |
| 3,005,496 A | * | 10/1961 | Nichols | 416/41 |
| 3,155,341 A | * | 11/1964 | Girard | 244/7 R |
| 3,713,750 A | * | 1/1973 | Williams | 416/20 R |
| 4,045,146 A | * | 8/1977 | Crimi | 416/1 |
| 4,507,050 A | * | 3/1985 | Jeffery et al. | 416/90 A |
| 4,534,702 A | * | 8/1985 | Johnson et al. | 416/20 R |
| 5,588,800 A | * | 12/1996 | Charles et al. | 416/24 |
| 5,711,651 A | * | 1/1998 | Charles et al. | 416/24 |
| 5,813,625 A | * | 9/1998 | Hassan et al. | 244/17.11 |
| 6,131,849 A | * | 10/2000 | Nyhus | 244/17.11 |
| 6,200,096 B1 | * | 3/2001 | Kohlhepp | 416/24 |
| 6,203,269 B1 | * | 3/2001 | Lorber et al. | 415/115 |
| 6,295,006 B1 | * | 9/2001 | Kohlhepp | 340/946 |
| 6,863,239 B2 | * | 3/2005 | Terpay | 244/17.11 |
| 6,948,906 B2 | * | 9/2005 | Leishman et al. | 415/119 |
| D524,227 S | | 7/2006 | Stille et al. | |
| D524,229 S | | 7/2006 | Stille et al. | |

(Continued)

FOREIGN PATENT DOCUMENTS

| | | | | |
|---|---|---|---|---|
| JP | 05319395 A | * | 12/1993 | B64C 21/00 |
| JP | 05345596 A | * | 12/1993 | B64C 21/04 |

*Primary Examiner* — Benjamin P Lee
(74) *Attorney, Agent, or Firm* — Cantor Colburn LLP (57) ABSTRACT

A rotary wing aircraft includes an airfame and an extending tail extending from the airframe. A main rotor assembly is operably connected to the airframe and includes a plurality of rotor blades operably connected to a rotor shaft, and one or more active adaptive devices located at one or more rotor blades of the plurality of rotor blades. The one or more active adaptive devices are operably connected to an aircraft flight control system such that, when activated, the one or more active adaptive devices change one or more operational characteristics of the rotor assembly. A tail rotor is operably connected to the extending tail. The tail rotor is rotatable about a tail rotor axis and the tail rotor axis movable from laterally-extending to rearward-extending.

24 Claims, 5 Drawing Sheets

(56) References Cited

U.S. PATENT DOCUMENTS

| | | |
|---|---|---|
| D524,230 S | 7/2006 | Stille et al. |
| 7,275,711 B1 * | 10/2007 | Flanigan .................... 244/17.11 |
| D614,559 S | 4/2010 | Alber et al. |
| 7,758,310 B2 | 7/2010 | Cotton et al. |
| 7,967,239 B2 | 6/2011 | Cotton et al. |
| 8,267,653 B2 * | 9/2012 | Nies et al. ......................... 416/1 |
| 2004/0169108 A1 * | 9/2004 | Terpay ....................... 244/17.11 |
| 2008/0135677 A1 * | 6/2008 | Oleshchuk et al. ........ 244/17.11 |
| 2012/0160954 A1 * | 6/2012 | Thomassey ................ 244/17.13 |

* cited by examiner

HIGH SPEED COMPOUND ROTARY WING AIRCRAFT

BACKGROUND OF THE INVENTION

The present disclosure relates to rotary-winged aircraft. More specifically, the present disclosure relates to helicopters with high-speed operational capabilities.

Helicopters have historically suffered from low operational cruise speeds, of up to about 160 knots. To increase the speed of operation of a conventional helicopter above that threshold, there is a tendency to increase a main rotor forward tip angle relative to the freestream airflow, which results in a high degree of main rotor flapping, reduced propulsive efficiency, reduced rotor stall margin, and reduced lift-to-drag ratio. Further, a negative fuselage angle of the helicopter relative to the freestream airflow is increased, the overall result being that the fuselage is downloaded, which requires yet more rotor power to overcome. The conventional tail of the helicopter including a conventional tail rotor adds drag due to the tail rotor hub position and tail rotor H-force drag, also requiring increased main rotor power to overcome.

Historically helicopters have included a wing extending from the fuselage to provide additional lift at the fuselage to compensate for the download and to increase stall margin of the main rotor. Including a wing, however, also often compromises helicopter design in other ways. First, the addition of the wing increases empty weight of the helicopter and increases vertical drag during hover operation. This results in lower payload capabilities and increased cost due to the additional components. The wing also increases parasitic drag during cruise operations, thus increasing cruise power required to attain the high speed operation and also increasing fuel burn. Finally, the physical size and location of the wing on the fuselage makes positioning of components such as cargo doors and rescue hoists difficult. The wing inhibits personnel movement aboard the helicopter, blocks visibility, and makes shipboard operations, where components such as main rotors are folded to save space, difficult.

BRIEF DESCRIPTION OF THE INVENTION

A rotary wing aircraft includes an airframe and an extending tail extending from the airframe. A main rotor assembly is operably connected to the airframe and includes a plurality of rotor blades operably connected to a rotor shaft, and one or more active adaptive devices located at one or more rotor blades of the plurality of rotor blades. The one or more active adaptive devices are operably connected to an aircraft flight control system such that, when activated, the one or more active adaptive devices change one or more operational characteristics of the rotor assembly. A tail rotor is operably connected to the extending tail. The tail rotor is rotatable about a tail rotor axis, the tail rotor axis movable from laterally-extending to rearward-extending.

A method of operating a rotary wing aircraft includes rotating a plurality of rotor blades of a main rotor assembly about a rotor shaft. One or more active adaptive devices located at one or more rotor blades of the plurality of rotor blades are activated. Activation of the one or more active adaptive devices results in changes in one or more operational characteristics of the rotor assembly. A plurality of tail rotor blades of a tail rotor are rotated about a tail rotor axis, the tail rotor located at an extending tail of the rotary wing aircraft. The tail rotor is moved such that the tail rotor axis changes from laterally-extending to rearward-extending.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The invention described herein is to enable efficient high speed helicopter forward flight. The configurations described herein reduce helicopter performance penalties incurred by conventional, wingless helicopters and reduces penalties associated with a winged helicopter configuration, which has been historically used to eliminate the aforementioned conventional helicopter performance penalties. This is achieved by the integrated design of an adaptive rotor system enabling efficient high speed forward flight with a tail rotor that is reconfigurable to an auxiliary propulsor. The combination enables a new synergistic thrust and/or power sharing relationship between a main rotor, fuselage, horizontal tail, vertical tail, and auxiliary propulsor.

Figure 1:
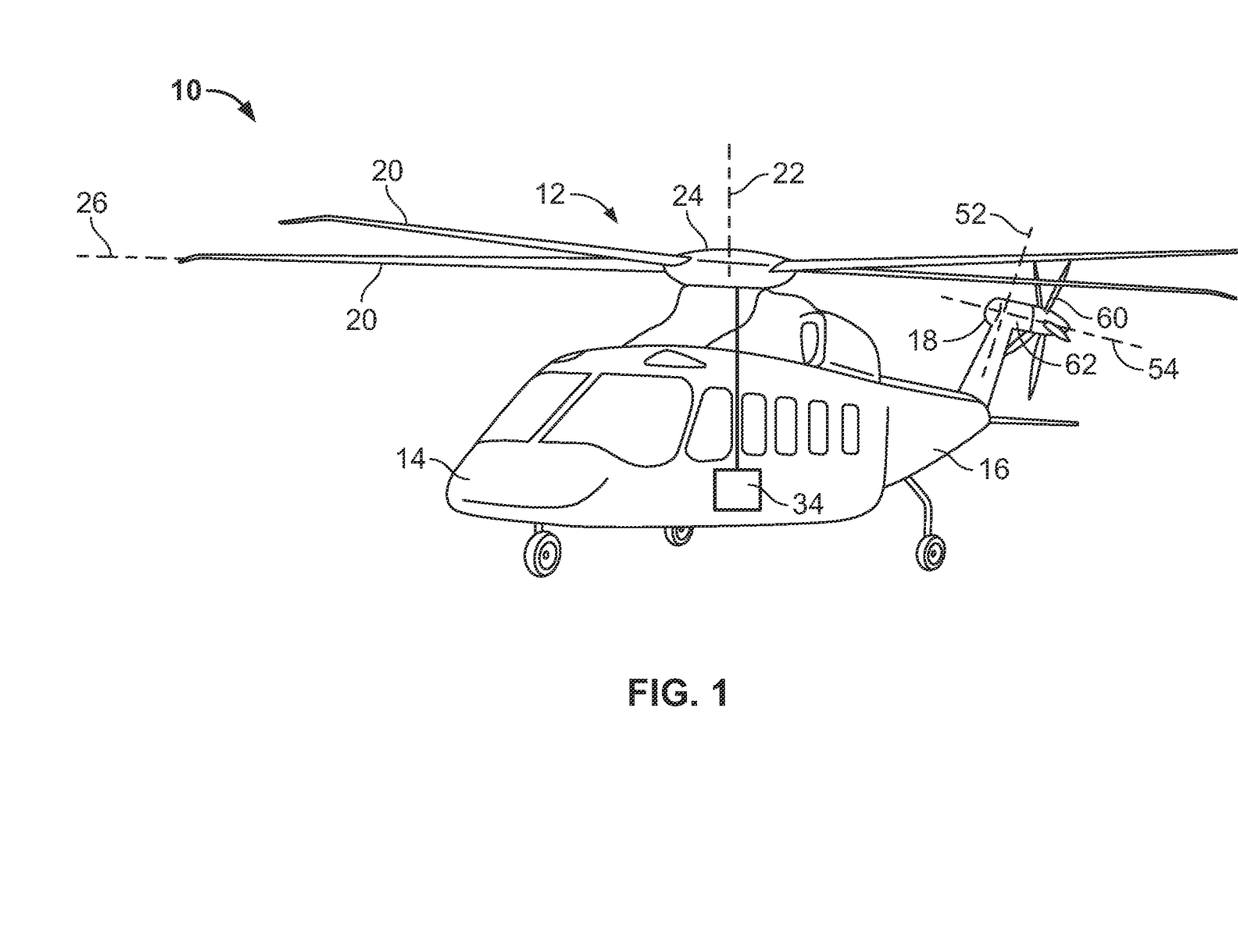
FIG. 1 is a schematic view of an embodiment of a rotary wing aircraft.

FIG. 1 is a schematic illustration of a rotary wing aircraft 10 having a main rotor assembly 12. The aircraft 10 includes an airframe 14 having an extending tail 16 at which is mounted a tail rotor 18. The main rotor assembly 12 includes a plurality of rotor blades 20 located about a rotor shaft 22. The rotor blades 20 are operably connected to the rotor shaft 22 via a swashplate 24, which allows for a change in pitch of the rotor blades 20 about a blade axis 26.

The rotor blades 20 include one or more active adaptive devices which allow the rotor blades 20 and main rotor assembly 12 to adapt to different flight regimes and the unique requirements of each mission. The adaptive devices, when selectively activated based on mission requirements, may, for example, increase maximum rotor blade 20 lift, suppress characteristics such as vibration and/or noise, increase flight speed, improve hover performance at high gross weights, increase maneuverability, or the like. A primary goal is to use the combination of multiple devices to enhance overall rotor attributes and performance. An individual on-blade device typically enhances one or two rotor attributes such as low noise, low vibration, efficiency, maneuverability, payload, or speed. The purpose is to use multiple devices to provide a rotor increased capabilities among all these attributes. The devices can be turned on or off as the mission segment requires. The devices are also designed to work synergistically to maximize rotor capabilities.

Figure 2:
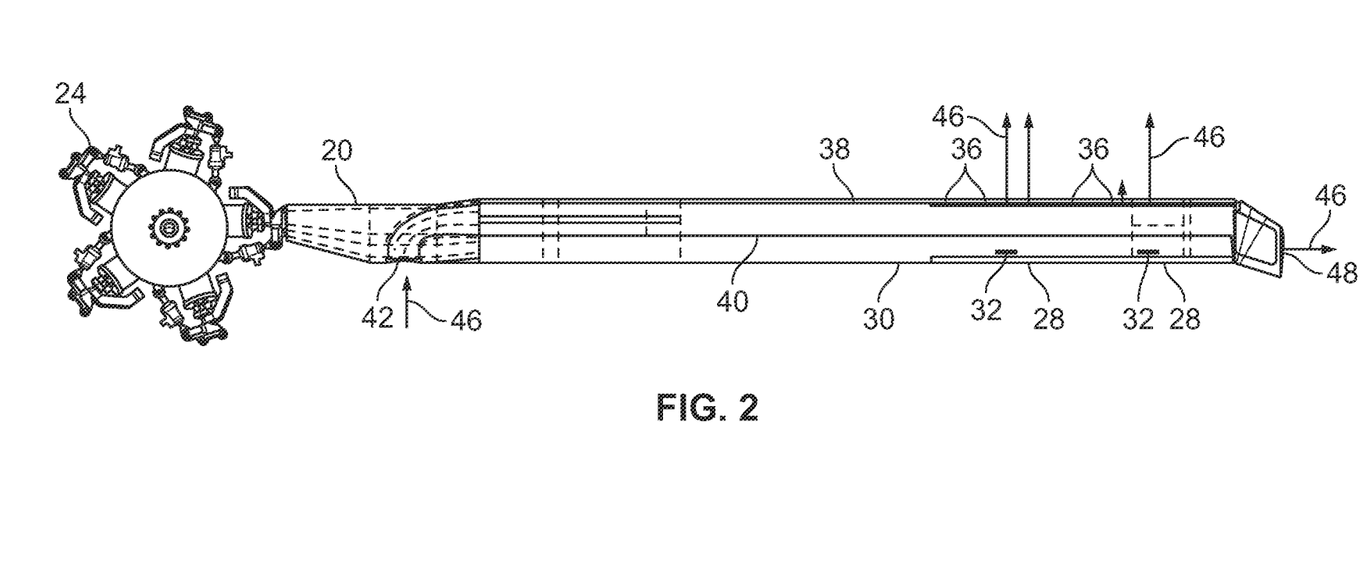
FIG. 2 is a plan view of an embodiment of a rotor blade.

Referring to FIG. 2, one example of adaptive device is one or more flaps 28 located, in some embodiments, at a trailing edge 30 of the rotor blade 20. Flaps 28 may be in the form of conventional plain flaps, movable Gurney flaps, or other trailing edge devices used to effect airfoil lift, drag, and moment. The flaps 28 are driven by one or more actuators, for example, one or more electromechanical actuators 32 or pneumatic actuators or the like located within the rotor blade 20. The actuators 32 are operably connected to the flaps 28 and to a flight control system of the aircraft 10, for example, a flight control computer 34 (shown in FIG. 1). When the one or more flaps 28 are activated at the same or higher harmonic frequencies of rotational speed of the rotor assembly 12, for example, the flaps 28 are activated and deactivated at a rate at or greater than once per revolution of the rotor assembly 12, vibration and noise of the rotor assembly 12 can be suppressed, and efficiency can be increased. Further, by activating the one or more flaps 28 discretely at a retreating side of the rotor assembly 12, at each rotor blade 20 when it is retreating, the flap 28 creates a higher lift coefficient, thus creating more blade lift for the same retreating side airflow. This advantageously postpones retreating blade stall to higher flight airspeeds. Also, activating flaps 28 collectively downwardly when the aircraft 10 is in hover effectively twists the rotor blade 20. The increased twist is beneficial at higher gross weights because the airflow through the rotor 12 increases, and increasing the twist better aligns the rotor blades 20 with the higher airflow. The net result is higher rotor efficiency at high gross aircraft 10 weights.

Figure 3:
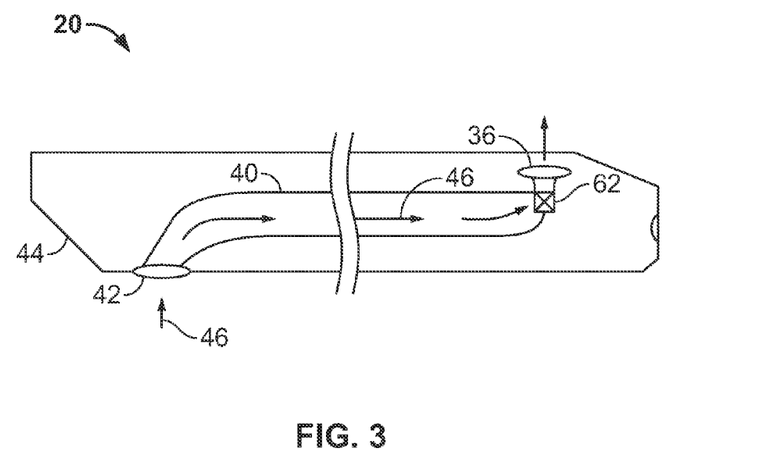
FIG. 3 is a plan view of an embodiment of a rotor blade including an internal duct.
Figure 4:
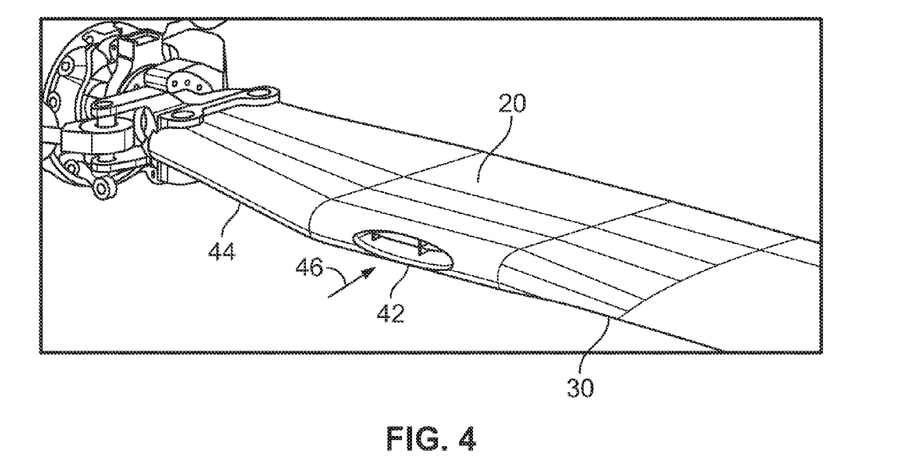
FIG. 4 is a perspective view of an embodiment of a rotor blade having an air inlet.
Figure 5:
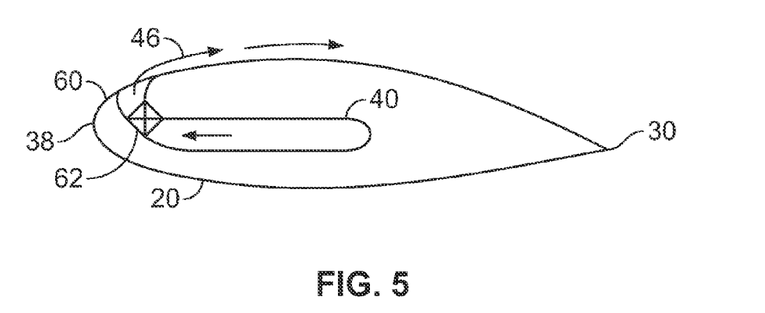
FIG. 5 is a cross-sectional view of an embodiment of a rotor blade having an internal duct.

Referring to FIG. 3, in some embodiments, the rotor blade 20 includes one or more air outlets 36 at or near a leading edge 38 of the rotor blade 20. In some embodiments, the air outlets 36 are located at a leading edge upper surface 60 of the rotor blade 20. The air outlets 36 may be slot shaped and are connected to an internal spar air duct 40 extending along a span of the rotor blade 20 from a duct inlet 42 to the air outlets 36. The duct 40 is fed by the duct inlet 42 (best shown in FIG. 4), which in some embodiments is located at or near a root 44 of the trailing edge 30. Referring again to FIG. 3, as the rotor blade 20 rotates, an airflow 46 is centrifugally pumped into the duct 40 through the duct inlet 42 and is accelerated toward the air outlets 36. The airflow 46 exits the air outlets 36 to increase maximum blade lift. Referring to FIG. 5, maximum blade lift is increased by blowing the air through the air outlets 36 substantially tangentially to the upper surface in a rearward direction, toward the trailing edge 30 of the rotor blade 20. The airflow 46 energizes the boundary layer and delays separation as angle of attack is increased thus increasing maximum blade lift. Referring again to FIG. 3, flow through the air outlets 36 may be controlled (turned on/off or metered) by one or more valves 62 located between the duct 40 and the air outlets 36. Operation of the one or more valves 62 may be controlled by the flight control computer 34.

It is highly desirable to reduce the noise of rotor assembly 12 in flight. A powerful means to reduce noise is to reduce rotational speed of rotor assembly 12. However, rotational speed reductions come at the expense of rotor assembly lift and aircraft speed and maneuverability. The reductions are due to rotor assembly stall occurring at reduced flight speeds and/or reduced gross weights. In order to maintain aircraft speed and maneuverability and not sacrifice aircraft gross weight, the flaps 28 and air outlets 36 are utilized at lower rotor assembly rotational speeds. Thus rotor assembly lift, and aircraft speed and maneuverability can be maintained at adequate levels. As such, synergy between flaps 28, outlets 36, and the rotational speed of the rotor assembly 12 reduces rotor assembly noise levels. In some embodiments rotational speed reductions between about 10% and 15% can be attained. In situations where an increased rotor assembly rotational speed is required or desired, such as when increased gross weight capability is desired, another active measure may be utilized to reduce rotor assembly 12 noise. For example, the rotor blade 20 may include a tip jet outlet 48 (shown in FIG. 6) located at a rotor blade tip 50 and connected to the duct 40. At increased rotor assembly speeds, airflow 46 through the duct 40 is directed through the tip jet outlet 48 instead of, or in addition to, through the air outlets 36.

Figure 6:
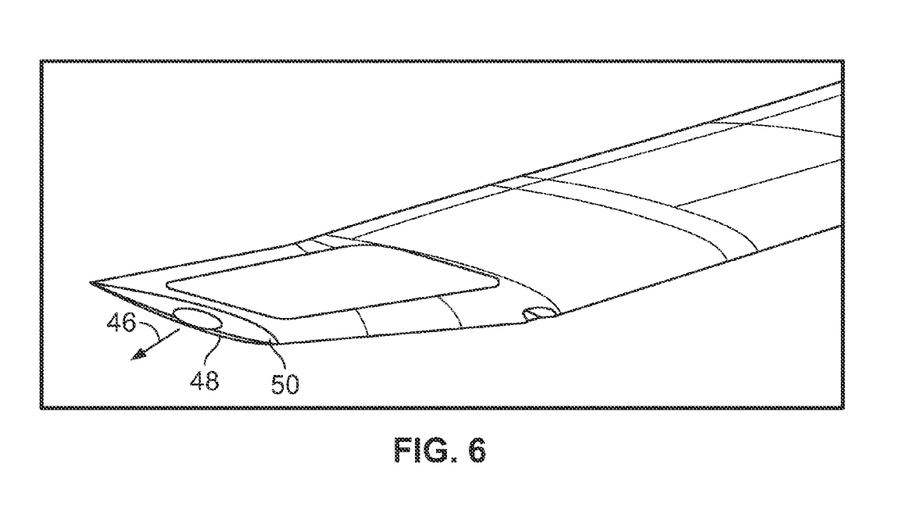
FIG. 6 is a perspective view of an embodiment of a rotor blade having an air outlet.

Airflow 46 pumped through the duct 40 creates a high pressure mass source at the blade tip 50. The mass source, when modulated by releasing airflow 46 through the tip jet valve and outlet 48, at a once per rotor 12 revolution frequency cancels rotor blade 20 thickness noise. The airflow 46 released through the tip jet outlet 48 creates a positive pressure pulse shape which counteracts a negative pressure pulse shape of the rotor blade 20. Rotor blade 20 noise is a result of this negative pressure pulse and by counteracting it with the positive pressure pulse the rotor blade 20 noise is reduced. In some embodiments, the airflow 46 through the tip jet outlet 48 is activated when the rotor blade 20 is advancing. Further, the airflow 46 through the tip jet outlet 48 may be modulated as a substantially constant flow to diffuse a vortex at the blade tip 50, thereby reducing blade vortex interaction noise.

The mission-adaptive rotor blade 20 as described above allows for operational cruise speed of the aircraft 10 of about 220 knots.

Figure 7:
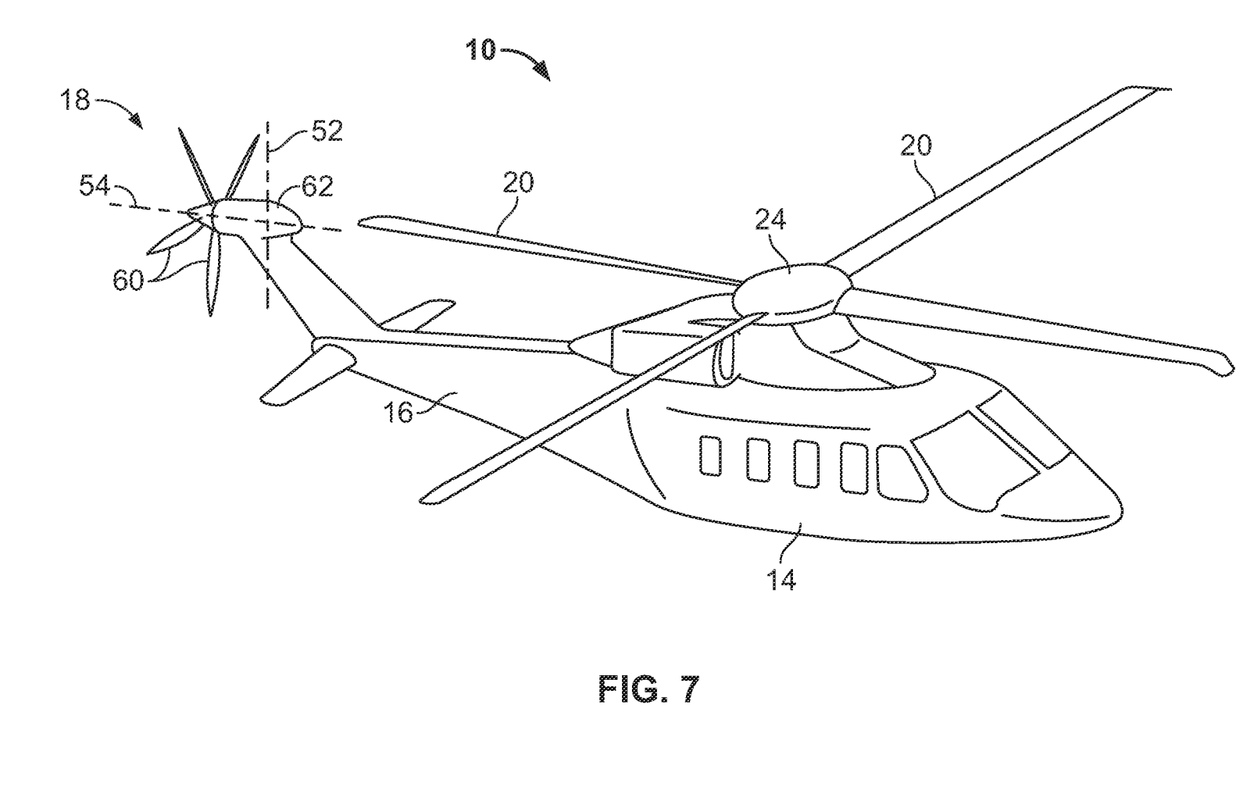
FIG. 7 is a schematic view of an embodiment of a rotary winged aircraft.

Referring again to FIG. 1, the tail rotor 18 is configurable as a conventional anti-torque rotor at low-speed operational conditions with a tail rotor axis 54 extending laterally from the extending tail 16, with a plurality of tail rotor blades 60 rotating about the tail rotor axis 54. Referring now to FIG. 7, the tail rotor 18 is rotatable about a tail axis 52 such that the tail rotor axis 54 faces rearward, thus configuring the tail rotor 18 as an auxiliary propulsor. In some embodiments, such rotation about the tail axis 52 is achievable in the range of 4-7 seconds. Further, the combination of the adaptive rotor blade 20 and the rearward-facing tail rotor 18 configuration alters forces acting on the aircraft 10 during high speed (over 160 knot) operation. First, a main rotor angle relative to horizontal is reduced, thus increasing propulsive efficiency, increasing lift-to-drag ratio of the main rotor assembly, and increasing main rotor stall margin. Second, an airframe 14 attitude angle is increased to 0 to +3 degrees nose up, compared to a conventional high speed configuration where the attitude angle is in the range of about −2 to as much as −5 degrees relative to horizontal. Since the tail rotor 18 is rotated parallel to airflow over the aircraft 10, tail rotor H-force is reduced, as well as drag caused by the tail rotor hub 62. Overall, the configuration results in reduced downward force acting on the airframe 14, thus resulting in greater propulsion efficiency, and reduced main rotor 12 power required to achieve and maintain high cruise speed operation. Further, these benefits are achieved without utilizing a wing extending from the airframe.

The combination of the adaptive main rotor 12 and the tail rotor 18 enables full aircraft 10 weight to be supported by the main rotor 12 with adaptive devices, thus eliminating the need for a wing. The laterally-extending to rearward-extending tail rotor 18 relieves the main rotor 12 from propulsive force, thus shifting the main rotor 12 from a nose down attitude to a near level attitude. The near level main rotor 12 attitude eliminates large main rotor 12 flapping thus reducing vibrational loads and increasing rotor head component life. The near level rotor attitude also increases rotor stall margin and rotor lift to drag ratio. It also raises fuselage 14 attitude from an uncomfortable negative download condition to a comfortable nose up lifting condition. The same attitude change drives the horizontal tail 16 from a negative download condition to a positive upload condition. The tail rotor 18 movement from lateral expending to rearward extending position reduces tail rotor 18 drag and further increases aircraft 10 efficiency. All of these advantages are dependent on the combination of active device main rotor 12, reconfigurable tail rotor 18, and the new combination of thrust and lift sharing derived from the new method of aircraft trim.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary wing aircraft comprising:
    an airframe;
    an extending tail extending from the airframe;
    a main rotor assembly operably connected to the airframe including:
        a plurality of rotor blades operably connected to a rotor shaft; and
        a spar air duct extending along one or more rotor blades of the plurality of rotor blades, the spar air duct having at least one inlet and at least one outlet, the at least one inlet disposed at a trailing edge of the rotor blade such that airflow is urged into the spar duct through the at least one inlet via rotation of the rotor blade about the rotor shaft, the spar air duct operably connected to an aircraft flight control system, the spar air duct including a valve located within the rotor blade to regulate airflow through the spar air duct such that, when the valve is activated, the airflow through the spar air duct changes one or more operational characteristics of the rotor assembly; and
    a tail rotor operably connected to the extending tail, the tail rotor rotatable about a tail rotor axis, the tail rotor axis movable from laterally-extending to rearward-extending.

2. The rotary wing aircraft of claim 1, wherein the tail rotor is utilized as an auxiliary propulsor when the tail rotor axis is configured to be rearward-extending.

3. The rotary wing aircraft of claim 1, wherein rotation of the tail rotor axis is achieved in about 4-7 seconds.

4. The rotary wing aircraft of claim 1, wherein a cruise speed of the rotary wing aircraft is in the range of about 160-220 knots.

5. The rotary wing aircraft of claim 1, further comprising at least one flap disposed at a trailing edge of at least one rotor blade of the plurality of rotor blades.

6. The rotary wing aircraft of claim 5, wherein a position of the at least one flap is controlled by one or more actuators disposed at the at least one rotor blade.

7. The rotary wing aircraft of claim 5, wherein activation of the one at least one flap at a selected rotational speed of the rotor assembly results in suppression of at least one of vibration or noise of the rotor assembly.

8. The rotary wing aircraft of claim 5, wherein activation of the at least one flap in a retreating portion of rotation of the rotor blade results in an increase in at least one of lift of the rotor assembly or flight speed of the aircraft.

9. The rotary wing aircraft of claim 1, wherein the at least one outlet is disposed in proximity to a leading edge of the one or more rotor blades.

10. The rotary wing aircraft of claim 9, wherein pumping airflow from the spar air duct through the at least one outlet toward the leading edge results in an increase in lift of the one or more rotor blades.

11. A method of operating a rotary wing aircraft comprising:
    rotating a plurality of rotor blades of a main rotor assembly about a rotor shaft;
    selectively urging an airflow into a spar air duct extending along one or more rotor blades of the plurality of rotor blades via rotation of the one or more rotor blades about the rotor shaft, the spar air duct having at least one inlet and at least one outlet, the at least one inlet disposed at an edge of the one or more rotor blades, the spar air duct including a valve located within the rotor blade, the valve operably connected to an aircraft flight control system to regulate the airflow through the spar air duct;
    changing one or more operational characteristics of the rotor assembly via the activation of the spar air duct; and
    rotating a plurality of tail rotor blades of a tail rotor about a tail rotor axis, the tail rotor disposed at an extending tail of the rotary wing aircraft; and
    moving the tail rotor such that the tail rotor axis changes from laterally-extending to rearward-extending.

12. The method of claim 11, further comprising utilizing the tail rotor as an auxiliary propulsor when the tail rotor axis is configured to be rearward-extending.

13. The method of claim 11, wherein rotation of the tail rotor axis is achieved in about 4-7 seconds.

14. The method of claim 11, wherein a cruise speed of the rotary wing aircraft is in the range of about 160-220 knots.

15. The method of claim 11, further comprising activating at least one flap disposed at a trailing edge of at least one rotor blade of the plurality of rotor blades.

16. The method of claim 15, wherein the at least one flap is activated at a selected rotational speed of the rotor assembly.

17. The method of claim 16, wherein changing one or more operational characteristics of the rotor assembly comprises suppressing at least one of vibration or noise of the rotor assembly.

18. The method of claim 15, wherein the at least one flap is activated in a retreating portion of rotation of the rotor blade.

19. The method of claim 18, wherein changing one or more operational characteristics of the rotor assembly comprises increasing at least one of lift of the rotor assembly or flight speed of the aircraft.

20. The method of claim 11, wherein the at least one outlet is disposed in proximity to a leading edge of the one or more rotor blades.

21. The method of claim 20, wherein urging the airflow through the at least one outlet results in an increase in lift of the one or more rotor blades.

22. The method of claim 11, wherein the at least one outlet is disposed at a radially outboard tip of the one or more rotor blades.

23. The method of claim 22, further comprising modulating an airflow through the at least one outlet in proximity to the tip of the one or more rotor blades thereby effecting a projected acoustic signature of the aircraft.

24. A rotary wing aircraft comprising:
an airframe;
an extending tail extending from the airframe;
a main rotor assembly operably connected to the airframe including:
a plurality of rotor blades operably connected to a rotor shaft;
a spar air duct extending along one or more rotor blades of the plurality of rotor blades, the spar air duct having at least one inlet and at least one outlet, the inlet located at a trailing edge of the rotor blade such that an airflow is urged into the spar air duct through the inlet via rotation of the rotor blade about the rotor shaft, the spar air duct including one or more valves located within the rotor blade, the one or more valves operably connected to the aircraft flight control system to control the airflow through the at least one outlet such that the airflow through the spar air duct changes one or more operational characteristics of the rotor assembly; and
at least one flap disposed at a trailing edge of at least one rotor blade of the plurality of rotor blades; and
a tail rotor operably connected to the extending tail, the tail rotor rotatable about a tail rotor axis, the tail rotor axis movable from laterally-extending to rearward-extending.

* * * * *